United States Patent
Yamasaki et al.

(10) Patent No.: US 11,809,831 B2
(45) Date of Patent: Nov. 7, 2023

(54) SYMBOL SEQUENCE CONVERTING APPARATUS AND SYMBOL SEQUENCE CONVERSION METHOD

(71) Applicant: KABUSHIKI KAISHA TOSHIBA, Minato-ku (JP)

(72) Inventors: Tomohiro Yamasaki, Bunkyo (JP); Yoshiyuki Kokojima, Yokohama (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 17/004,069

(22) Filed: Aug. 27, 2020

(65) Prior Publication Data
US 2021/0209314 A1 Jul. 8, 2021

(30) Foreign Application Priority Data
Jan. 8, 2020 (JP) ................................ 2020-001450

(51) Int. Cl.
*G06F 40/42* (2020.01)
*G06F 40/55* (2020.01)
*G06F 40/51* (2020.01)

(52) U.S. Cl.
CPC .............. *G06F 40/42* (2020.01); *G06F 40/51* (2020.01); *G06F 40/55* (2020.01)

(58) Field of Classification Search
CPC .......... G06F 40/42; G06F 40/51; G06F 40/55; G06F 40/284; G06F 16/3346;
(Continued)

(56) References Cited

U.S. PATENT DOCUMENTS 10,049,655 B1 * 8/2018 Cherepanov .......... G10L 15/187
2003/0088416 A1 * 5/2003 Griniasty .............. G10L 15/144
704/260

(Continued)

FOREIGN PATENT DOCUMENTS

JP 2009-199434 A 9/2009
JP 2010-9329 A 1/2010

OTHER PUBLICATIONS

Yao et al., "Sequence-to-Sequence Neural Net Models for Grapheme-to-Phoneme Conversion", arXiv: 1506.00196v3 [cs.CL], Aug. 20, 2015, 5 pages.

*Primary Examiner* — Wilson W Tsui
(74) *Attorney, Agent, or Firm* — Oblon, McClelland, Maier & Neustadt, L.L.P.

(57) ABSTRACT

A symbol sequence converting apparatus according to an embodiment includes one or more hardware processors. The processors: generates a plurality of candidate output symbol sequences, based on rule information in which input symbols are each associated with one or more output symbols each obtained by converting the corresponding input symbol in accordance with a predetermined conversion condition, the plurality of candidate output symbol sequences each containing one or more of the output symbols and corresponding to an input symbol sequence containing one or more of the input symbols; derives respective confidence levels of the plurality of candidate output symbol sequences by using a learning model; and identifies, as an output symbol sequence corresponding to the input symbol sequence, the candidate output symbol sequence corresponding to a highest confidence level.

7 Claims, 6 Drawing Sheets

(58) Field of Classification Search
CPC ............ G06F 16/90344; G06F 40/157; G06F 40/205; G06N 20/00
See application file for complete search history.

(56) References Cited

U.S. PATENT DOCUMENTS

| | | | |
|---|---|---|---|
| 2005/0060138 A1* | 3/2005 | Wang | G06F 3/018 704/1 |
| 2006/0111907 A1* | 5/2006 | Mowatt | G10L 15/183 704/257 |
| 2006/0265220 A1* | 11/2006 | Massimino | G10L 13/08 704/235 |
| 2007/0174040 A1* | 7/2007 | Liu | G06F 40/40 704/2 |
| 2007/0213983 A1* | 9/2007 | Ramsey | G10L 15/22 704/254 |
| 2009/0248422 A1* | 10/2009 | Li | G06F 40/44 704/277 |
| 2016/0179774 A1* | 6/2016 | McAteer | G06F 40/232 704/9 |
| 2018/0308003 A1* | 10/2018 | Singh | G06F 40/284 |
| 2021/0043196 A1* | 2/2021 | Lee | G10L 15/187 |

* cited by examiner

| INPUT SYMBOL | CONVERSION CONDITION | OUTPUT SYMBOL |
|---|---|---|
| A | FOLLOWED BY PLURALITY OF CONSONANTS | æ |
| A | FOLLOWED BY CONSONANT + E | eɪ |
| B |  | b |
| AR | PRECEDED BY W | ɔː |
| AR | NOT PRECEDED BY W | aː |
| ER | FOLLOWED BY R | er |
| ER | NOT FOLLOWED BY R | əː |
| G | FOLLOWED BY N | (SILENT) |
| G | FOLLOWED BY I + CONSONANT | g |
| G | FOLLOWED BY Y | dʒ |
| G | OTHER CONDITIONS | g |
| K | POSITIONED AT HEAD AND FOLLOWED BY N | (SILENT) |
| K |  | k |
| OO |  | u OR uː |
| ... | ... | ... |

SYMBOL SEQUENCE CONVERTING APPARATUS AND SYMBOL SEQUENCE CONVERSION METHOD

CROSS-REFERENCE TO RELATED APPLICATIONS

This application is based upon and claims the benefit of priority from Japanese Patent Application No. 2020-001450, filed on Jan. 8, 2020; the entire contents of which are incorporated herein by reference.

FIELD

An embodiment described herein relates generally to a symbol sequence converting apparatus and a symbol sequence conversion method.

BACKGROUND

Techniques for converting a symbol sequence, such as an alphabetical character string, into a way of reading in a specific language have been disclosed. For example, a technique has been disclosed, in which ways of reading alphabetical character strings are output in Japanese by using an English phonetic transcription dictionary for alphabetical character strings and rule data in which ways of reading in Japanese corresponding to English phonetic transcriptions are associated therewith. There has been also known a method that employs a Seq2Seq (sequence-to-sequence) framework to enable direct conversion of a character string forming an English word into a phonetic symbol sequence without using alignment information.

However, conventional techniques make it necessary to previously have alignment information that represents which part of an input symbol sequence, such as an alphabetic character string, corresponds to which phonetic transcription. It is difficult to automatically infer such alignment information. Even when the Seq2Seq framework is used, the conversion accuracy is inconsistent, and an output symbol sequence that represents an unnatural way of reading or unnatural pronunciation is output from an input symbol sequence in some cases. That is, an output symbol sequence corresponding to an input symbol sequence has been difficult to highly accurately identify using the conventional techniques.

DETAILED DESCRIPTION

A symbol sequence converting apparatus according to an embodiment includes one or more hardware processors. The processors: generates a plurality of candidate output symbol sequences, based on rule information in which input symbols are each associated with one or more output symbols each obtained by converting the corresponding input symbols in accordance with a predetermined conversion condition, the plurality of candidate output symbol sequences each containing one or more of the output symbols and corresponding to an input symbol sequence containing one or more of the input symbols; derives respective confidence levels of the plurality of candidate output symbol sequences by using a learning model; and identifies, as an output symbol sequence corresponding to the input symbol sequence, the candidate output symbol sequence corresponding to a highest confidence level.

The following describes a symbol sequence converting apparatus and a symbol sequence conversion method in detail with reference to the accompanying drawings.

Figure 1:
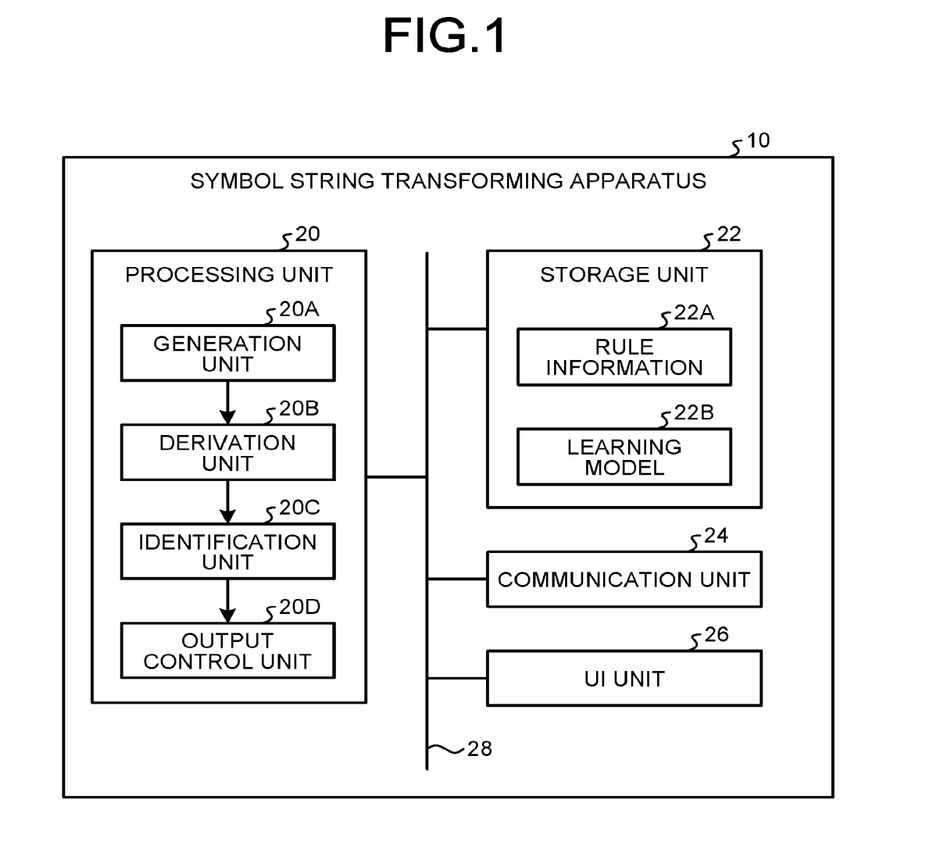
FIG. 1 is a schematic diagram illustrating a functional configuration of a symbol sequence converting apparatus according to an embodiment.

FIG. 1 is a schematic diagram illustrating an example of a functional configuration of a symbol sequence converting apparatus 10 according to the present embodiment.

The symbol sequence converting apparatus 10 includes a processing unit 20, a storage unit 22, a communication unit 24, and a user interface (UI) unit 26. The processing unit 20, the storage unit 22, the communication unit 24, and the UI unit 26 are connected to one another by a bus 28 so that each of the units can transfer and receive data or signals to and from another.

At least one of the storage unit 22, the communication unit 24, and the UI unit 26 may be connected to the processing unit 20 over a network. That is, at least one of the storage unit 22, the communication unit 24, and the UI unit 26 may be provided in an external device that is connected to the symbol sequence converting apparatus 10 over a network. A configuration in which at least one of the functional units in the processing unit 20 that are described below is provided in the external device may be employed. The external device is, for example, an external server.

The storage unit 22 stores various kinds of data. The storage unit 22 is, for example, a semiconductor memory element such as a random access memory (RAM) or a flash memory, a hard disk, or an optical disc. The storage unit 22 may be a storage device provided outside the symbol sequence converting apparatus 10. The storage unit 22 may be a storage medium. Specifically, the storage medium may be one having a computer program or various kinds of information downloaded thereto via a local area network (LAN) or the Internet and stored or temporarily stored therein. The storage unit 22 may be composed of a plurality of storage mediums.

In the present embodiment, the storage unit 22 stores rule information 22A and a learning model 22B. The details of the rule information 22A and the learning model 22B are described down below.

The communication unit 24 communicates with an external device over a network. The UI unit 26 has a function of receiving an operation input by a user and a function of outputting various kinds of information.

The UI unit 26 includes, for example, a display and an input unit. The display displays various kinds of information. The display is, for example, a publicly known device such as an organic electro-luminescence (EL) display, a liquid crystal display (LCD), or a projector. The input unit receives various instructions from a user. The input unit is, for example, a keyboard, a mouse, a touch panel, or a microphone. The UI unit 26 may be configured in the form of a touch panel including an input mechanism and an output mechanism. The UI unit 26 may further include a speaker, which outputs sound.

The processing unit 20 includes a generation unit 20A, a derivation unit 20B, an identification unit 20C, and an output control unit 20D. At least one of the generation unit 20A, the derivation unit 20B, the identification unit 20C, and the output control unit 20D is implemented by, for example, one or more hardware processors. The above individual units may be implemented by, for example, causing having a hardware processor such as a central processing unit (CPU) to execute a computer program. That is, the above individual units may be implemented by software. The above individual units may be implemented by a dedicated processor such as an integrated circuit (IC), that is, implemented by hardware. The above individual units may be implemented by a combination of software and hardware. When a plurality of hardware processors are used, each of the processors may implement one of the individual units or implement two or more of the individual units.

The generation unit 20A generates, based on the rule information 22A, a plurality of candidate output symbol sequences that correspond to an input symbol sequence. The details of the rule information 22A are described down below.

An input symbol sequence is a symbol sequence to be transformed by the symbol sequence converting apparatus 10. An input symbol sequence is composed of one or more input symbols. Each of the input symbols is, for example, a character such as an alphabet, or a symbol.

The input symbol sequence is, for example, a phonogram string, a character string that contains either an ideogram or a logogram or both, a character string that contains a logogram, or an unnormalized character string.

A phonogram string refers to a string of phonograms. The phonogram refers to a character in a writing system in which each character represents a phoneme or a syllable. The phonogram string is, for example, a character string in a language such as English or Thai. The phonogram string is composed of one or more input symbols each being, for example, an alphabet.

The character string that contains either an ideogram or a logogram or both refers to a string of characters that include at least an ideogram and a logogram. The ideogram refers to a character in a writing system in which each character represents a meaning. An ideogram is, for example, an ancient Egyptian character. The logogram refers to a character in a writing system in which each character represents a word or a morpheme in a language. The logogram is, for example, a Chinese character. Some of the Chinese characters may be categorized as ideograms. That is, input symbols that constitute a character string that contains either an ideogram or a logogram or both are, for example, Chinese characters or ancient Egyptian characters.

An unnormalized character string refers to a character string that is not yet normalized into a correct character string or that is not yet normalized into a meaningful and correct array or a correct combination of characters. The unnormalized character string is, for example, a character string that contains at least one of a spelling variant and a word-form variant. Input symbols that constitute an unnormalized character string are, for example, numerals, Chinese characters, hiragana (Japanese), katakana (Japanese), or symbols.

The candidate output symbol sequence refers to a character string that serves as a candidate for an output symbol sequence corresponding to an input symbol sequence. The output symbol sequence is composed of one or more output symbols. The output symbol refers to a character or symbol that constitutes an output symbol sequence. The kinds of the output symbol sequence differ depending on the kind of the corresponding input symbol sequence.

Specifically, for example, when the input symbol sequence is a phonogram string, an output symbol sequence corresponding to this input symbol sequence is a phoneme string. A phoneme string is, for example, a pronunciation for a phonogram string. When the input symbol sequence is a character string that contains either an ideogram or a logogram or both, an output symbol sequence corresponding to this input symbol sequence is a symbol sequence that represents a way of reading the character string. In a case where the character string is written in the Japanese language, a way of reading a character string may be a phonetic transcription in kana for a character string that contains characters such as a Chinese character.

When the input symbol sequence is an unnormalized character string, the output symbol sequence corresponding to this input symbol sequence is a normalized character string. Specifically, for example, when the unnormalized character string is "got", the normalized character string is "get".

The generation unit 20A generates, based on the rule information 22A, a plurality of candidate output symbol sequences that are candidates for output symbols corresponding to an input symbol sequence.

The rule information 22A is a database in which each input symbol is associated with one or more output symbols obtained by converting the input symbol in accordance with a predetermined conversion condition. The data format of the rule information 22A is not limited to the database.

Figure 2:
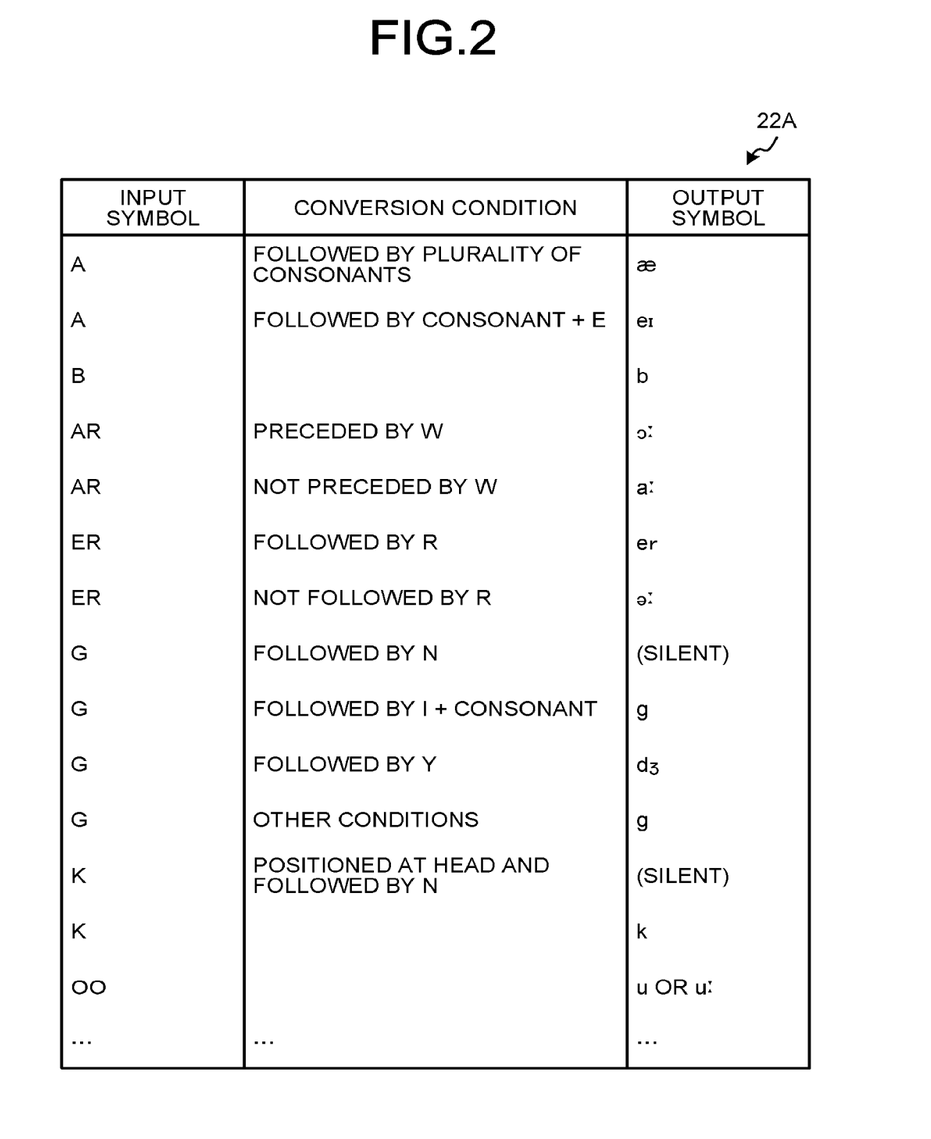
FIG. 2 is a schematic diagram lustrating a data structure of rule information according to the embodiment.

FIG. 2 is a schematic diagram illustrating an example of a data structure of the rule information 22A. In FIG. 2, an example of input symbols and output symbols is illustrated, in which an input symbol sequence is a phonogram string and an output symbol sequence is a phoneme string that represents a pronunciation. Specifically, in FIG. 2, input symbols are alphabets and output symbols are pronunciation symbols. The pronunciation symbols are an example of output symbols that represent phonemes of pronunciation. Each input symbol illustrated in FIG. 2 is a spelling according to a method of phonics.

A conversion condition refers to a condition under which the corresponding input symbol is transformed into the corresponding output symbol. In other words, the conversion condition defines, as a rule, an output symbol to be output with respect to each input symbol in an input symbol sequence depending on which of the other input symbols precede and follow that input symbol.

For example, the conversion condition "followed by consonant+E" illustrated in FIG. 2 means that, when an input symbol sequence containing an input symbol "A" has a consonant and "E" that are aligned in a row subsequent to the input symbol "A", an output symbol "eɪ" is output.

The generation unit 20A reads a plurality of input symbols constituting an input symbol sequence, in order from the first input symbol to the last input symbol. Then, the generation unit 20A transforms the input symbols in accordance with the corresponding conversion conditions, thereby generating an output symbol sequence that contains output symbols corresponding to the input string. The reading of input symbols in order from the first to the last input symbols refers to reading of input symbols in order from the first input symbol in a reading direction of the input symbol sequence.

As illustrated in FIG. 2, the rule information 22A has input symbols each associated with one or more conversion conditions.

The generation unit 20A reads input symbols constituting an input symbol sequence, in order from the first to the last input symbols, and transforms each of the read input symbols by using the rule information 22A in accordance with the corresponding one or more conversion conditions. By performing this conversion processing, the generation unit 20A obtains one or more output symbols for each input symbol that constitutes the input symbol sequence. Thus, the generation unit 20A generates, from one input symbol sequence, a plurality of candidate output symbol sequences that are generated in accordance with different combinations of conversion conditions.

For example, the following assumes that an input symbol sequence 30 is "BOOK". In this case, as shown in the rule information 22A of FIG. 2, an output symbol corresponding to an input symbol "B" is "b". An output symbol corresponding to an input symbol "OO" is "u" or "u:". An output symbol that corresponds to an input symbol "K" is "k". Thus, in this case, the generation unit 20A generates "buk" and "bu:k" as the candidate output symbol sequences 32 from "BOOK" given as the input symbol sequence 30.

The description is continued with reference to FIG. 1 again. The derivation unit 20B derives respective confidence levels of the candidate output symbol sequences by using the learning model 22B. The identification unit 20C identifies, as an output symbol sequence corresponding to the input symbol sequence, the candidate output symbol sequence corresponding to the highest confidence level.

Figure 3:
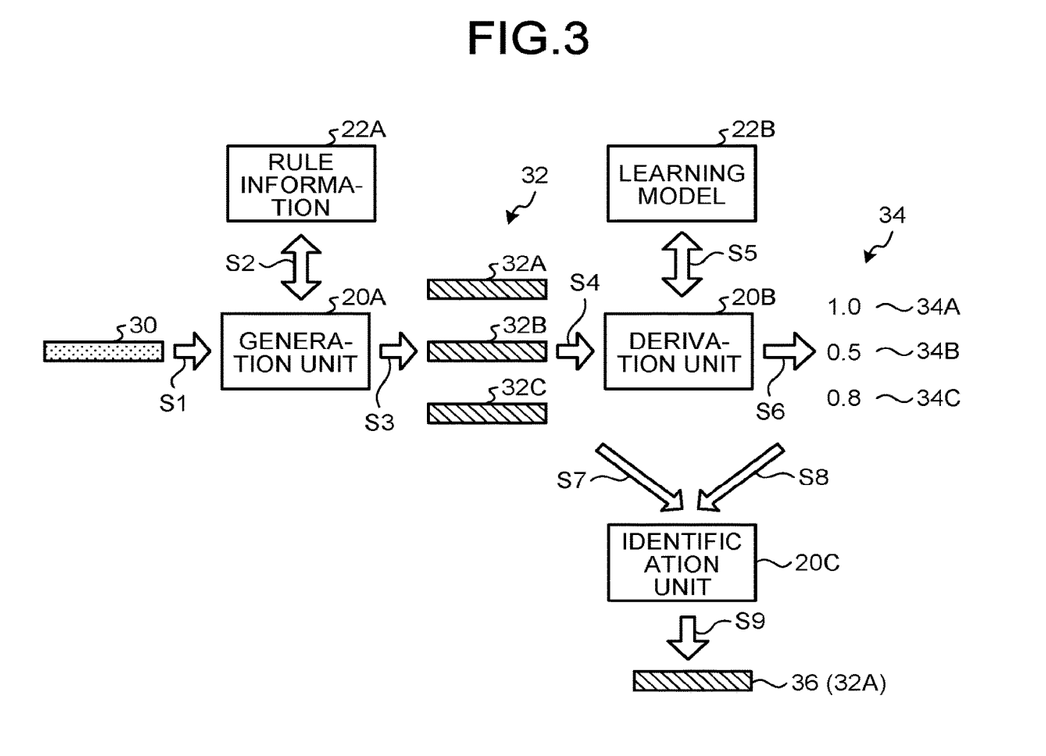
FIG. 3 is a schematic diagram illustrating a procedure of processing for identifying an output symbol sequence according to the embodiment.

FIG. 3 is a schematic diagram illustrating an example of the procedure of processing that the processing unit 20 performs for identifying an output symbol sequence 36 from the input symbol sequence 30.

The generation unit 20A generates, by using the rule information 22A, the candidate output symbol sequences 32 from the input symbol sequence 30 (steps S1, S2, and S3). In FIG. 3, the three candidate output symbol sequences 32 (a candidate output symbol sequence 32A, a candidate output symbol sequence 32B, and a candidate output symbol sequence 32C) are generated from the single input symbol sequence 30.

The derivation unit 20B derives respective confidence levels 34 (confidence levels 34A to 34C) of the candidate output symbol sequences 32 (the candidate output symbol sequences 32A to 32C) by using the learning model 22B (steps S4, S5, and S6).

The identification unit 20C identifies, as the output symbol sequence 36, the candidate output symbol sequence 32 (for example, a candidate output symbol sequence 32A) corresponding to the highest confidence level 34 among the candidate output symbol sequences 32 (the candidate output symbol sequences 32A to 32C) (steps S7, S8, and S9).

The derivation unit 20B and the identification unit 20C are described in detail.

The derivation unit 20B derives the confidence levels 34 by using the learning model 22B for deriving the confidence levels 34 from input data composed of one-to-one pairs each consisting of the input symbol sequence 30 and one of the candidate output symbol sequences 32.

That is, the learning model 22B is a neural network model for deriving the confidence levels 34 from input data composed of one-to-one pairs each consisting of the input symbol sequence 30 and one of the candidate output symbol sequences 32. The learning model 22B is learned in advance and stored in the storage unit 22.

The confidence levels 34 represent degrees of similarity between the respective candidate output symbol sequences 32 and a correct output symbol sequence. The correct output symbol sequence refers to an output symbol sequence as a correct answer for the input symbol sequence 30.

The degrees of similarity between the respective candidate output symbol sequences 32 and a correct output symbol sequence have higher values as the distances between the respective candidate output symbol sequences 32 and the correct output symbol sequence are shorter. Examples of the distance include an edit distance based on the similarity between the alignments of symbols, and a phoneme distance based on similarity in terms of phonemes or pronunciations. In the present embodiment, the edit distance and the phoneme distance take a value "0" when the candidate output symbol sequence 32 and the correct output symbol sequence completely match with each other, and take a value "1" when the both do not match with each other. Values of the edit distance and the phoneme distance are closer to "0" as the matching level between the candidate output symbol sequence 32 and the correct output symbol sequence is closer to the complete state from the incomplete state.

In the present embodiment, the minimum value and the maximum value of the degree of similarity are "0" and "1", respectively. While the minimum value of the degree of similarity represents that the candidate output symbol sequence 32 and the correct output symbol sequence are dissimilar to each other, the maximum value of the degree of similarity represents that the both completely match with (or are identical to) each other.

The edit distance is a scale of dissimilarity between the candidate output symbol sequence 32 and the correct output symbol sequence.

For example, the edit distance between the candidate output symbol sequence 32 and the correct output symbol sequence represents the distance between output symbols that constitute candidate output symbol sequence 32 and output symbols that constitute the correct output symbol sequence. In this case, the edit distance between the candidate output symbol sequence 32 and the correct output symbol sequence means the number of operations needed to perform, on characters (input symbols), conversion of the candidate output symbol sequence 32 into the correct output symbol sequence. Each of the operations to be performed on characters means insertion, deletion, or replacement.

Figure 4:
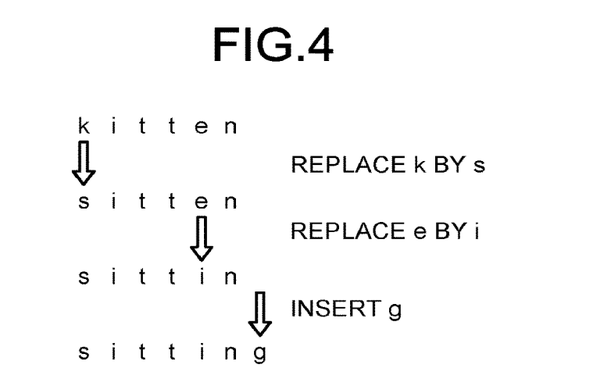
FIG. 4 is a diagram explaining an edit distance according to the embodiment.

FIG. 4 is a diagram explaining an example of the edit distance between the candidate output symbol sequence 32 and the correct output symbol sequence. The following assumes a case that the candidate output symbol sequence 32 is "kitten" and the correct output symbol sequence is "sitting".

The number of operations in this case, that is, the number of operations needed to transform "kitten" into "sitting" is three in total. And, the operations to be performed are: replacement of the first character "k" with "s"; replacement of the fifth character "e" with "i"; and insertion of "g" as the seventh character. Thus, in this case, the edit distance between the candidate output symbol sequence 32 and the correct output symbol sequence is "3".

Here, S is used to denote the candidate output symbol sequence 32, Len(S) is used to denote the number of characters thereof, T is used to denote the correct output symbol sequence, and Len(T) is used to denote the number of characters thereof. The edit distance D(S,T) between S and T can be expressed by Formula (1) given below. This is because conversion of S into T can be completed by deleting characters of S one by one and inserting characters of T one by one.

$$0 \leq D(S,T) \leq \text{Len}(S) + \text{Len}(T) \quad (1)$$

In Formula (1), D(S,T) represents the edit distance between the candidate output symbol sequence 32 and the correct output symbol sequence. The definitions of Len(S) and Len(T) are the same as described above.

Thus, provided that Formula (1) given above holds, the degree of similarity is represented by a value in the range between and including 0 and 1.

$$C(S,T) = 1 - D(S,T)/(\text{Len}(S) + \text{Len}(T)) \quad (2)$$

In Formula (2), C(S,T) represents the degree of similarity between the candidate output symbol sequence 32 and the correct output symbol sequence.

The edit distance is not limited to those that take a form representing the distance between output symbols that constitute the candidate output symbol sequence 32 and output symbols that constitute the correct output symbol sequence. For example, the edit distance may take a form the distance taken syllable by syllable.

Instead, the phoneme distance represents a distance in terms of phonemes or a distance in terms of pronunciations. The phoneme distance is a scale of dissimilarity between the phonemes or the pronunciations of the input symbol sequence 30 and the candidate output symbol sequence 32. For example, the phoneme distance between the candidate output symbol sequence 32 and the correct output symbol sequence takes a smaller value as the feature of the sounds are closer to each other and takes a larger value as the feature of the sounds are farther apart from each other. For example, the sounds of characters in the da-column in the Japanese syllabary are known to be similar to the sounds of those in the ra-column therein. The feature of the sounds may be values that are derived by a publicly known method.

As the phoneme distance between the candidate output symbol sequence 32 and the correct output symbol sequence, an input result from a user for the similarity between the sounds of synthesized voices for the candidate output symbol sequence 32 and for the correct output symbol sequence. In that case, the derivation unit 20B may output synthesized voices for the candidate output symbol sequence 32 and a correct output symbol sequence from a speaker. The derivation unit 20B may then use, as the phoneme distance, the input result for the similarity between the sounds that has been input via an operation instruction performed by the user on the UI unit 26. The derivation unit 20B may use, as the phoneme distance, a value "0" when the input result represents that the sounds match with each other, and a value "1" when the input result represents that the sounds do not match with each other. Then, a value may be used, which is transformed to be closer to "0" as the input result represents that the sounds are more similar.

For example, the following assumes that an input symbol sequence 30 is "BOOK". In this case, as described above, the generation unit 20A generates, from "BOOK" given as the input symbol sequence 30, "buk" and "bu:k" as the candidate output symbol sequences 32 by using the rule information 22A (FIG. 2).

Here, the correct output symbol sequence that corresponds to the input symbol sequence 30 "BOOK" is "buk". Thus, in this case, the edit distance of one of the candidate output symbol sequences 32 "buk" is "0", and the degree of similarity is "1" from Formula (2) given above. The edit distance of the other one of the candidate output symbol sequences 32 "bu:k" is "1" because only an output symbol ":" is different. In this case, from Formula (2) given above, the degree of similarity of the candidate output symbol sequence 32 "bu:k" is calculated as 1−1/(3+4)=0.86.

The following assumes that the input symbol sequence 30 is an unnormalized character string and is a character string that contains a spelling variant. In this case, as the edit distance and the phoneme distance between the candidate output symbol sequence 32 and the correct output symbol sequence, for example, the similarity between respective ways of reading or respective spelling variants of the candidate output symbol sequence 32 and the correct output symbol sequence.

The derivation unit 20B may use the degree of similarity as the confidence level 34. That is, the learning model 22B may be a model that derives the degree of similarity as the confidence level 34. The degree of similarity is higher as at least one of the edit distance and the phoneme distance between the candidate output symbol sequence 32 for the input symbol sequence 30 and a correct output symbol sequence is smaller. The correct output symbol sequence is the output symbol sequence 36, which is correct for the input symbol sequence 30.

Preferably, the learning model 22B is a model for deriving, as the confidence level 34, a value obtained by converting a degree of similarity using a unique function.

The unique function refers to a function that the change rate of the confidence level 34 over the change rate of the above degree of similarity is higher as the degree of similarity is closer to a value that represents complete identicalness. In the present embodiment, the value "1" represents the degree of similarity for a complete match.

Figure 5:
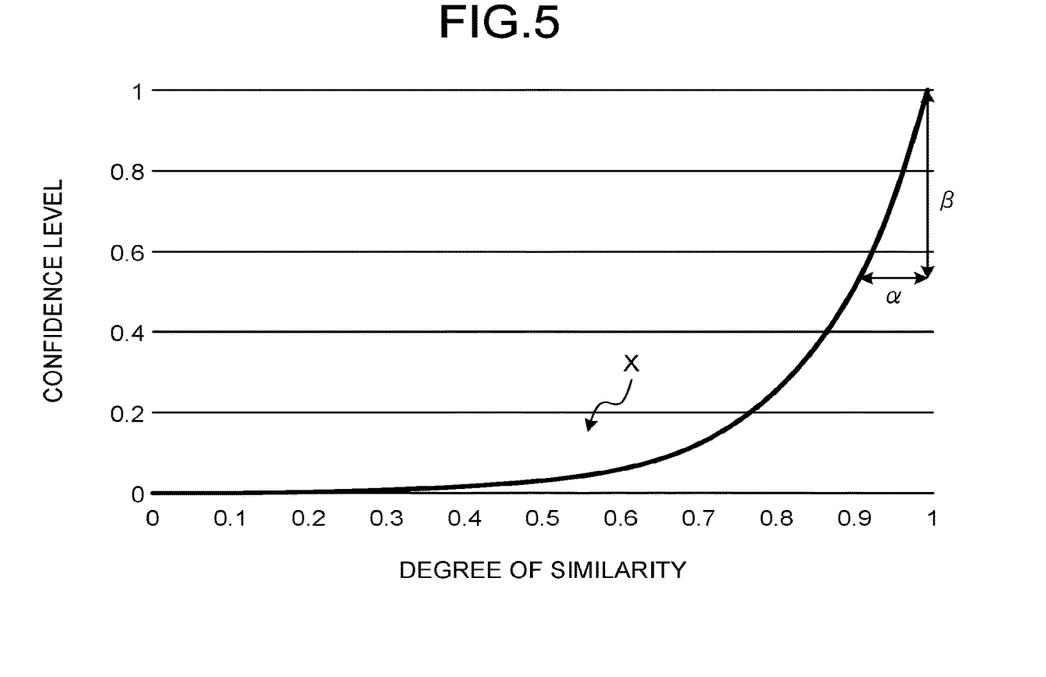
FIG. 5 is a diagram explaining a mathematical function according to the embodiment.

FIG. 5 is a diagram explaining a curve representing a function X, which an example of the unique function. In FIG. 5, the horizontal axis represents the degree of similarity between the candidate output symbol sequence 32 and the correct output symbol sequence. In FIG. 5, the vertical axis represents the confidence level 34 for the candidate output symbol sequence 32. The confidence level 34 at "1" corresponds to the degree of similarity at "1". The degree of similarity at "1" means that the candidate output symbol sequence 32 and the correct output symbol sequence are completely identical.

As illustrated in FIG. 5, the function X is a function in which the change rate the confidence level 34 over the change rate a of the corresponding degree of similarity becomes higher as the degree of similarity is closer to "1" at which the degree of similarity represents complete identicalness. For example, the function X is expressed by Formula (3) given below.

$$f(x) = (1024^x - 1)/1023 \quad (3)$$

The following assumes that the degree of similarity has been calculated by using foregoing Formula (1) and Formula (2). As described above, C(S,T) is the degree of similarity, and D(S,T) is the edit distance. In this case, the difference between the degrees of similarity when C(S,T) is "0" (that is, complete identicalness) and when D(S,T) is "1" (that is, difference of one character) equals to the difference between the degrees of similarity when D(S,T) is "1" and when D(S,T) is "2". Even in such a case, values obtained by correcting the degrees of similarity using the function X are used as the confidence level 34, whereby values for the degrees of similarity that are close to each other can be corrected into the confidence levels 34 that are values more different from each other.

Thus, the confidence levels 34 of the candidate output symbol sequences 32 take values representing a larger difference for a smaller change in degree of similarity as the degrees of similarity of the candidate output symbol sequences 32 to the correct output symbol sequence are higher. Therefore, the derivation unit 20B is able to represent, in the form of the confidence levels 34, which are more discriminable from one another, a plurality of candidate output symbol sequences 32 that have high degrees of similarity to the correct output symbol sequence.

For example, the following assumes that the input symbol sequence 30 is "BOOK". In this case, as described above, the generation unit 20A generates, from "BOOK" given as the input symbol sequence 30, "buk" and "bu:k" as the candidate output symbol sequences 32 by using the rule information 22A. In addition, as described above, the degree of similarity of "buk" "1", and the degree of similarity of "bu:k" is "0.86".

Then, the function X is applied, whereby "1" is derived as the confidence level 34 for "buk", and "0.37" is derived as the confidence level 34 for "bu:k".

Thus, the derivation unit 20B can derive the confidence levels 34 that enable accurate discrimination between: the candidate output symbol sequence 32 for which the degree of similarity represents complete identicalness to the correct output symbol sequence; and the candidate output symbol sequence 32 for which the degree of similarity does not represent complete identicalness to the correct output symbol sequence. The derivation unit 20B is able to derive the confidence levels 34 that also enable the candidate output symbol sequences 32, the degrees of similarity of which to the correct output symbol sequence are relatively high, to be discriminated between one another.

The description is continued with reference to FIG. 1 again. The derivation unit 20B derives the confidence levels 34 using: input data that is composed of one-to-one pairs each consisting of the input symbol sequence 30 and one of the candidate output symbol sequence 32; and the learning model 22B.

Figure 6:
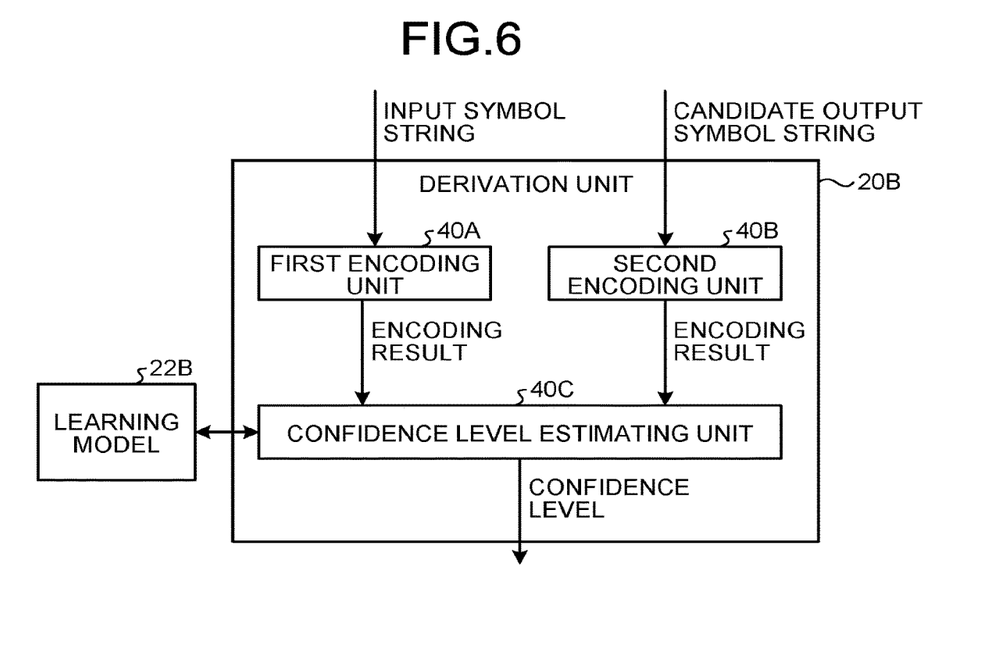
FIG. 6 is a functional block diagram of a derivation unit according to the embodiment.

FIG. 6 is a functional block diagram illustrating an example of the derivation unit 20B.

The derivation unit 20B includes a first encoding unit 40A, a second encoding unit 40B, and a confidence level estimating unit 40C.

The first encoding unit 40A is a recurrent neural network (RNN) that encodes the input symbol sequence 30. The first encoding unit 40A encodes the input symbol sequence 30 and outputs the encoding result to the confidence level estimating unit 40C. The encoding result for the input symbol sequence 30 is represented by, for example, a numerical string expressed as a vector.

The second encoding unit 40B is an RNN that encodes the candidate output symbol sequences 32. The second encoding unit 40B encodes each of the candidate output symbol sequences 32 and outputs the encoding result to the confidence level estimating unit 40C. The encoding result for the candidate output symbol sequence 32 is represented by, for example, a numerical string expressed as a vector.

The confidence level estimating unit 40C derives the confidence level 34 for the candidate output symbol sequence 32 using: the encoding result for the input symbol sequence 30; the encoding result for the candidate output symbol sequences 32; and the learning model 22B. That is, the confidence level estimating unit 40C derives the confidence level 34 as output data from the learning model 22B by inputting the encoding result for the input symbol sequence 30 and the encoding result for the candidate output symbol sequence 32, as input data, to the learning model 22B.

The description is continued with reference to FIG. 3 again. The identification unit 20C identifies, from among the candidate output symbol sequences 32 (the candidate output symbol sequences 32A to 32C) generated by the generation unit 20A, the candidate output symbol sequence 32 that corresponds to the highest one of the confidence levels 34 (the confidence levels 34A to 34C) derived by the derivation unit 20B. In the example illustrated in FIG. 3 the identification unit 20C identifies, from among the candidate output symbol sequences 32A to 32C, the candidate output symbol sequence 32A that corresponds to the highest confidence level 34. The identification unit 20C then identifies, as the output symbol sequence 36 corresponding to the input symbol sequence 30, the candidate output symbol sequence 32A thus identified.

The description is continued with reference to FIG. 1 again. The output control unit 20D outputs the output symbol sequence 36 identified by the identification unit 20C to the UI unit 26. The UI unit 26 displays the output symbol sequence 36 identified. Thus, the output control unit 20D can provide a user with the output symbol sequence 36, which is highly accurate, corresponding to the input symbol sequence 30.

The output control unit 20D may output the output symbol sequence 36 identified by the identification unit 20C to an external device via the communication unit 24. In this case, the output control unit 20D can provide the external device with the output symbol sequence 36, which is highly accurate, corresponding to the input symbol sequence 30.

The output control unit 20D may store the output symbol sequence 36 identified by the identification unit 20C in the storage unit 22.

Next, training on the learning model 22B is described. As described above, the learning model 22B is previously trained and previously stored in the storage unit 22. The learning model 22B may be obtained by learning in the symbol sequence converting apparatus 10. For example, the derivation unit 20B may be enabled to function as a training unit.

Figure 7:
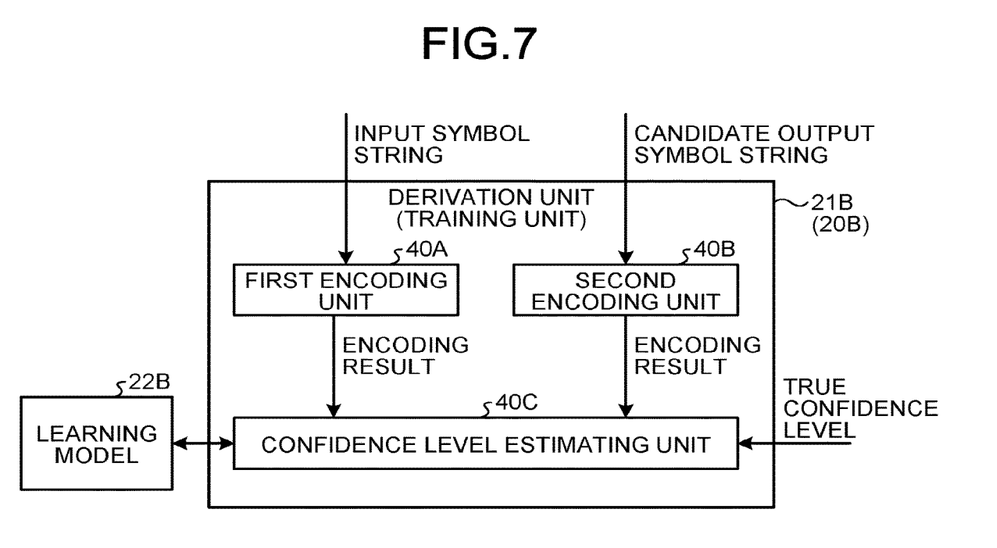
FIG. 7 is a diagram explaining a training unit according to the embodiment.

FIG. 7 is a diagram explaining an example of a training unit 21B. In the present embodiment, a mode in which the derivation unit 20B functions as the training unit 21B when the learning model 22B is trained is described as an example.

The training unit 21B includes the first encoding unit 40A, the second encoding unit 40B, and the confidence level estimating unit 40C. The first encoding unit 40A, the second encoding unit 40B, and the confidence level estimating unit 40C are the same as described above.

When the learning model 22B is trained, a plurality of pairs of input symbol sequences 30 and candidate output symbol sequences 32 are used that serve as training data with each of the pairs being treated as a pair of the input symbol sequence 30 and the candidate output symbol sequences 32. The pairs that serve as training data are pairs that each contains a candidate output symbol sequence 32 for which a true confidence level has been already derived previously. A true confidence level is the confidence level that is correct for the candidate output symbol sequence 32. Then, the confidence level estimating unit 40C executes the following processing.

More specifically, the confidence level estimating unit 40C derives the confidence level 34 for the candidate output symbol sequence 32, as a tentative confidence level 34, by using: the encoding result for the input symbol sequence 30; the encoding result for the candidate output symbol sequences 32; and the learning model 22B that has been generated.

The confidence level estimating unit 40C then adjusts the encoding result for the candidate output symbol sequence 32 such that the derived tentative confidence level 34 can be the true confidence level of the candidate output symbol sequence 32.

In addition, the confidence level estimating unit 40C updates weight values of the learning model 22B by using: the encoding result for the input symbol sequence 30; the adjusted encoding result for the candidate output symbol sequence 32; the tentative confidence level 34 thus derived; and the true confidence level. The training unit 21B trains the learning model 22B through this update processing. The learning model 22B may be trained by means of a publicly known training method.

The training unit 21B may be configured as a member separate from the derivation unit 20B. In this case, the symbol sequence converting apparatus 10 may further include the training unit 21B. Alternatively, the training unit 21B may be provided in an external device.

Next, an example of the procedure of the symbol sequence conversion processing that is executed by the symbol sequence converting apparatus 10 according to the present embodiment is described.

Figure 8:
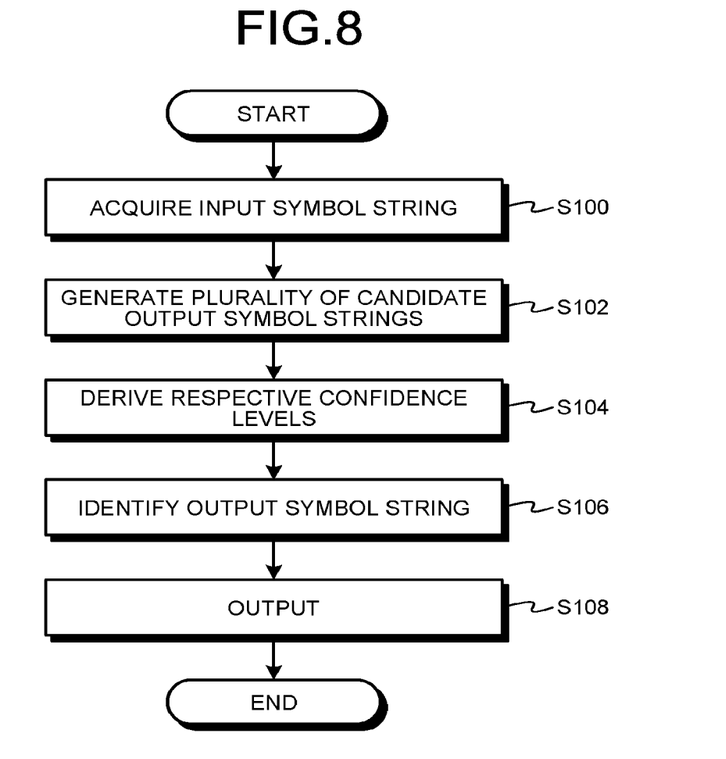
FIG. 8 is a flowchart illustrating a procedure of symbol sequence conversion processing according to the embodiment.

FIG. 8 is a flowchart illustrating an example of the procedure of the symbol sequence conversion processing that is executed by the symbol sequence converting apparatus 10.

The generation unit 20A acquires an input symbol sequence 30 on which symbol sequence conversion is to be executed (step S100). For example, the generation unit 20A acquires the input symbol sequence 30 from the storage unit 22. The generation unit 20A may acquire the input symbol sequence 30 from an external device via the communication unit 24.

Subsequently, using the rule information 22A, the generation unit 20A generates a plurality of candidate output symbol sequences 32 from the input symbol sequence 30 acquired at step S100 (step S102).

Using the learning model 22B, the derivation unit 20B derives respective confidence levels 34 for the candidate output symbol sequences 32 generated at step S102 (step S104).

The identification unit 20C identifies, as an output symbol sequence 36, the candidate output symbol sequence 32 corresponding to the highest confidence level 34 derived at step S104, from among the candidate output symbol sequences 32 generated at step S102 (step S106).

The output control unit 20D outputs the output symbol sequence 36 identified at step S106 to the UI unit 26 or an external device (step S108). This ends the present routine.

As described above, the symbol sequence converting apparatus 10 according to the present embodiment includes the generation unit 20A, the derivation unit 20B, and the identification unit 20C. Based on the rule information 22A in which input symbols are each associated with one or more output symbols each obtained by converting the corresponding input symbol in accordance with a predetermined conversion condition, the generation unit 20A generates a plurality of candidate output symbol sequences 32 each containing one or more of the output symbols and corresponding to an input symbol sequence 30 that contains one or more of the input symbols. The derivation unit 20B derives respective confidence levels 34 for the plurality of candidate output symbol sequences 32 by using the learning model 22B. The identification unit 20C identifies, as an output symbol sequence 36 corresponding to the input symbol sequence 30, the candidate output symbol sequence 32 that corresponds to the highest confidence level 34.

Here, conventional techniques cannot completely prevent an unnatural output symbol sequence from being identified as one that corresponds to the input symbol sequence 30.

For example, the conventional techniques make it necessary to previously have alignment information that represents which part of an input symbol sequence, such as an alphabetic character string, corresponds to which phonetic transcription. It is difficult to automatically infer such alignment information. Thus, the conventional techniques cannot completely prevent an output symbol sequence that represents an unnatural way of reading in Japanese from being identified as one that corresponds to the input symbol sequence.

In addition, a recent attempt is known that is aimed at training a neural network by feeding a huge number of pairs of input and output thereto identifying an output symbol sequence from an input symbol sequence 30 without separating graphemes. Specifically, a method is known by which, while eliminating the use of alignment information, a character string that forms an English word is directly transformed into a phonetic symbol sequence by use of the Seq2Seq framework, which is used in deep-learning based natural language processing.

However, even when the Seq2Seq framework is used, the conversion accuracy is inconsistent, and an output symbol sequence that represents an unnatural reading or pronunciation is occasionally output from an input symbol sequence 30.

In contrast, the symbol sequence converting apparatus 10 according to the present embodiment generates, by using the rule information 22A, a plurality of candidate output symbol sequences 32 from an input symbol sequence 30. The symbol sequence converting apparatus 10 then derives respective confidence levels 34 of the candidate output symbol sequences 32 by using the learning model 22B. The symbol sequence converting apparatus 10 then identifies, as an output symbol sequence 36, the candidate output symbol sequence 32 that corresponds to the highest confidence level 34.

In this manner, the symbol sequence converting apparatus 10 according to the present embodiment generates, by using the rule information 22A, the plurality of candidate output symbol sequences 32 from one input symbol sequence 30. Using the learning model 22B, the symbol sequence converting apparatus 10 then derives respective confidence levels 34 that reflect the degrees of similarity between these candidate output symbol sequences 32 and a correct output symbol sequence. The symbol sequence converting apparatus 10 then identifies, as an output symbol sequence 36, one of the candidate output symbol sequences 32 that corresponds to the highest confidence level 34.

Thus, the symbol sequence converting apparatus 10 according to the present embodiment is capable of identifying, as the output symbol sequence 36, the candidate output symbol sequence 32 that has the highest likelihood of being the output symbol sequence 36 among the candidate output symbol sequences 32. The symbol sequence converting apparatus 10 can therefore avoid identifying, in association with the input symbol sequence 30, an output symbol sequence 36 that represents an unnatural way of reading, an unnatural pronunciation, an unnatural normalized character string, or the like.

Consequently, the symbol sequence converting apparatus 10 according to the present embodiment can highly accurately identify an output symbol sequence 36 corresponding to an input symbol sequence 30.

Specifically, the symbol sequence converting apparatus 10 according to the present embodiment can highly accurately identify, in association with an input symbol sequence 30 composed of phonograms in a language such as English or Thai, an output symbol sequence 36 that represents pronunciation. The symbol sequence converting apparatus 10 according to the present embodiment can also highly accurately identify, in association with an input symbol sequence 30 that is an unnormalized character string that contains a spelling variant, a word-form variant, or the like, an output symbol sequence 36 that is a correct character string not containing any spelling variant or word-form variant, or the like.

The symbol sequence converting apparatus 10 according to the present embodiment can also use the learning model 22B for deriving, as a confidence level 34, a value obtained by converting a degree of similarity using the unique function X. As described with reference to FIG. 5, the unique function X is a function that the change rate (β) of the confidence level 34 over the change rate (α) of the corresponding degree of similarity is higher as the degree of similarity is closer to a value that represents complete identicalness.

Thus, the symbol sequence converting apparatus 10 according to the present embodiment can derive the confidence levels 34 that enable accurate discrimination between: the candidate output symbol sequence 32 for which the degree of similarity represents complete identicalness to the correct output symbol sequence; and the candidate output symbol sequence 32 for which the degree of similarity does not represent complete identicalness to the correct output symbol sequence. Thus, the symbol sequence converting apparatus 10 can highly accurately identify, as an output symbol sequence 36, the candidate output symbol sequence 32 that is completely identical to a correct output symbol sequence. The symbol sequence converting apparatus 10 can also identify, as an output symbol sequence 36, the candidate output symbol sequence 32 that corresponds to a higher degree of similarity than the other candidate output symbol sequences 32.

Next, an example of the hardware configuration of the symbol sequence converting apparatus 10 in the above embodiment is described.

Figure 9:
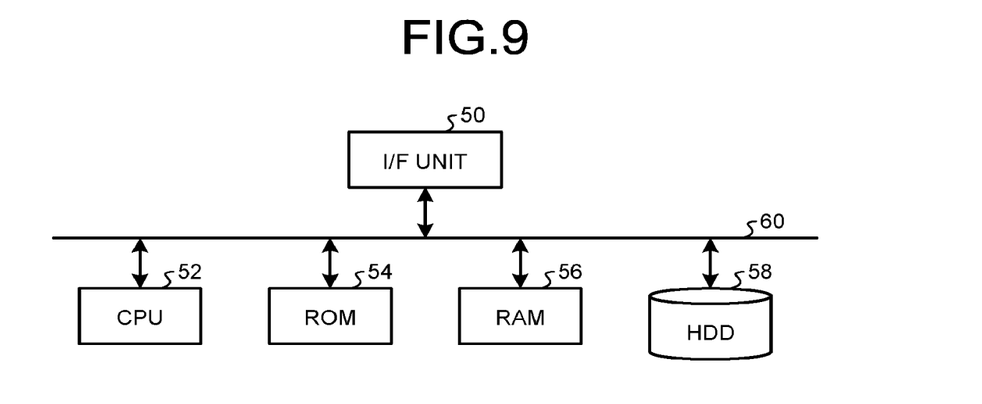
FIG. 9 is a hardware configuration diagram according to the embodiment.

FIG. 9 is an example of the hardware configuration diagram of the symbol sequence converting apparatus 10 according to the above embodiment.

The symbol sequence converting apparatus 10 includes a control device such as a central processing unit (CPU) 52, storage devices such as a read only memory (ROM) 54, a random access memory (RAM) 56, and a hard disk drive (HDD) 58, an I/F unit 50 that functions as an interface with various kinds of device, and a bus 60 that connects the individual units to one another. The symbol sequence converting apparatus 10 thus has a hardware configuration using a regular computer.

In the symbol sequence converting apparatus 10 in the above embodiment, the CPU 52 reads a computer program out from the ROM 54 onto the RAM 56 and executes the computer program, whereby the above individual units are implemented on a computer.

A computer program for executing any of the above individual parts of processing to be executed in the symbol sequence converting apparatus 10 may be previously stored in the HDD 58. A computer program for executing any of the above individual parts of processing to be executed in the symbol sequence converting apparatus 10 may be provided by being previously embedded in the ROM 54.

A computer program for executing any of the above individual parts of processing to be executed in the symbol sequence converting apparatus 10 may be provided as a computer program product by being stored as a file of an installable format or an executable format in a computer-readable storage medium such as a compact disc read only memory (CD-ROM), compact disc recordable (CD-R), a memory card, digital versatile disc (DVD), or a flexible disk (FD). A computer program for executing any of the above individual parts of processing to be executed in the symbol sequence converting apparatus 10 may be stored on a computer connected to a network such as the Internet and be provided by being downloaded via the network. A computer program for executing any of the above individual parts of processing to be executed in the symbol sequence converting apparatus 10 may be provided or distributed via a network such as the Internet.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A symbol sequence converting apparatus comprising one or more hardware processors configured to:
    generate a plurality of candidate output symbol sequences, based on rule information in which input symbols are each associated with one or more output symbols each obtained by converting the corresponding input symbol in accordance with a predetermined conversion condition, the plurality of candidate output symbol sequences each containing one or more of the output symbols and corresponding to an input symbol sequence containing one or more of the input symbols;
    derive respective confidence levels of the plurality of candidate output symbol sequences by using a learning model;
    identify, as an output symbol sequence corresponding to the input symbol sequence, the candidate output symbol sequence corresponding to a highest confidence level; and
    store, in a storage unit, the output symbol sequence identified, wherein
    the learning model is for deriving the confidence levels from input data consisting of the candidate output symbol sequences or the input symbol sequence, each of the confidence levels is a degree of similarity between the candidate output symbol sequence and a correct output symbol sequence corresponding to the input symbol sequence, the learning model is for deriving a value as a confidence level, the value being obtained by converting the degree of similarity by using a function in which a change rate of the confidence level over a change rate of a corresponding degree of similarity is higher as the degree of similarity is closer to a value representing complete identicalness, and the confidence level is a value representing a larger difference for a smaller change in degree of similarity as the degree of similarity is higher.

2. The apparatus according to claim 1, wherein the one or more hardware processors derive the confidence levels by using the learning model for deriving the confidence levels from input data composed of pairs each consisting of the input symbol sequence and one of the candidate output symbol sequences.

3. The apparatus according to claim 1, wherein the degree of similarity is higher as either an edit distance or a phoneme distance between the candidate output symbol sequence and the correct output symbol sequence is smaller.

4. The apparatus according to claim 1, wherein the one or more hardware processors are further configured to train the learning model.

5. The apparatus according to claim 1, wherein the input symbol sequence and the output symbol sequence corresponding to the input symbol sequence are
- a phonogram string and a phoneme string, respectively,
- a character string containing one of an ideogram and a logogram, respectively, or
- an unnormalized character string and a normalized character string, respectively.

6. A symbol sequence conversion method implemented by a computer, the method comprising:
- generating a plurality of candidate output symbol sequences, based on rule information in which input symbols are each associated with one or more output symbols each obtained by converting the corresponding input symbol in accordance with a predetermined conversion condition, the plurality of candidate output symbol sequences each containing one or more of the output symbols and corresponding to an input symbol sequence containing one or more of the input symbols;
- deriving respective confidence levels of the plurality of candidate output symbol sequences by using a learning model;
- identifying, as an output symbol sequence corresponding to the input symbol sequence, the candidate output symbol sequence corresponding to a highest confidence level; and
- storing, in a storage unit, the output symbol sequence identified, wherein the learning model is for deriving the confidence levels from input data consisting of the candidate output symbol sequences or the input symbol sequence, each of the confidence levels is a degree of similarity between the candidate output symbol sequence and a correct output symbol sequence corresponding to the input symbol sequence, the learning model is for deriving a value as a confidence level, the value being obtained by converting the degree of similarity by using a function in which a change rate of the confidence level over a change rate of a corresponding degree of similarity is higher as the degree of similarity is closer to a value representing complete identicalness, and the confidence level is a value representing a larger difference for a smaller change in degree of similarity as the degree of similarity is higher.

7. The apparatus according to claim 1, wherein the conversion condition defines, as a rule, an output symbol to be output with respect to each input symbol in an input symbol sequence depending on which of other input symbols precedes and follows the input symbol.

* * * * *